Figure 1:
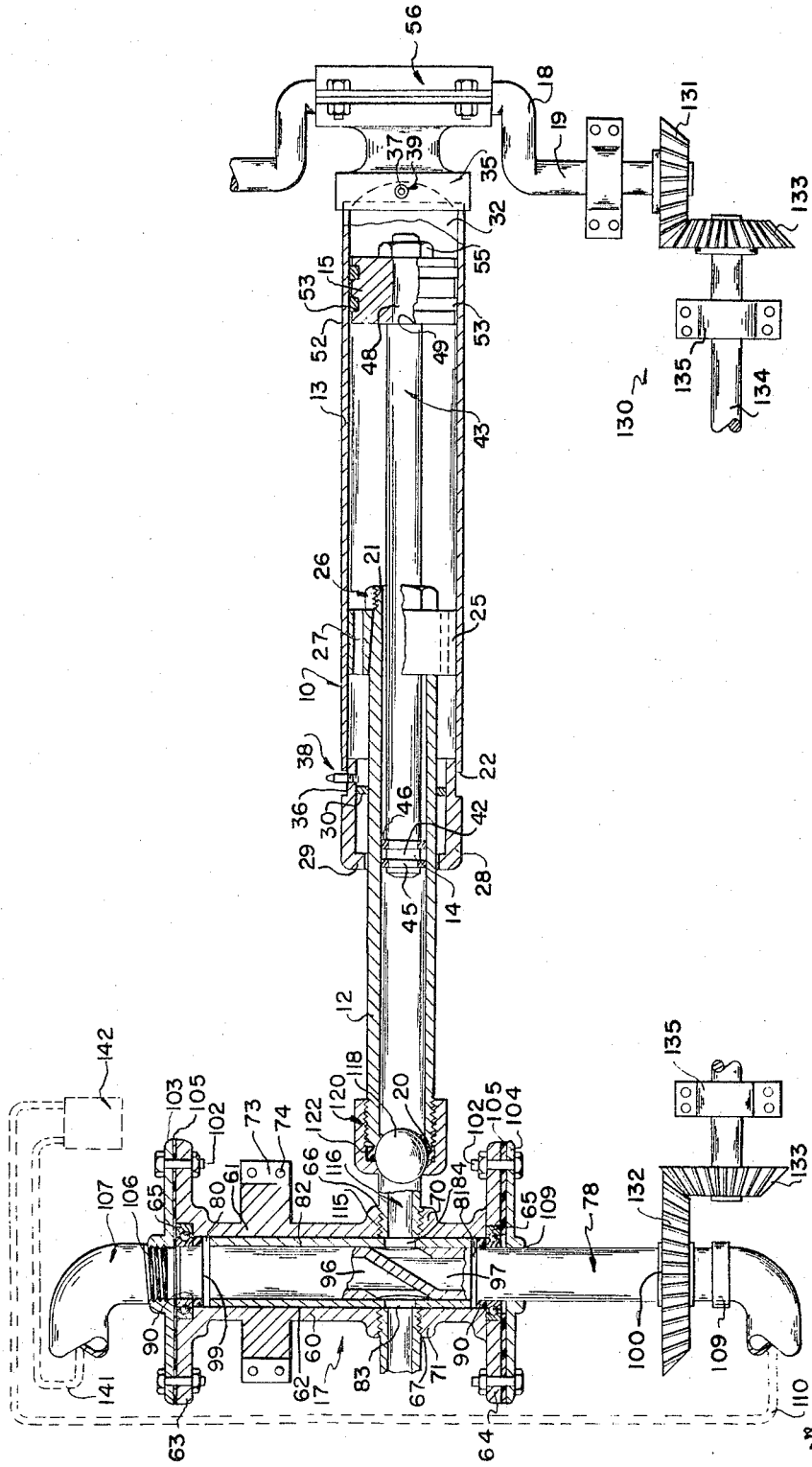

Feb. 6, 1968     H. F. SHANNON     3,367,241

BI-FLUID HYDRAULIC TRANSMISSION

Filed Feb. 14, 1966     2 Sheets-Sheet 1

INVENTOR
HENRY F. SHANNON
BY
Featherstonhaugh
ATTORNEYS

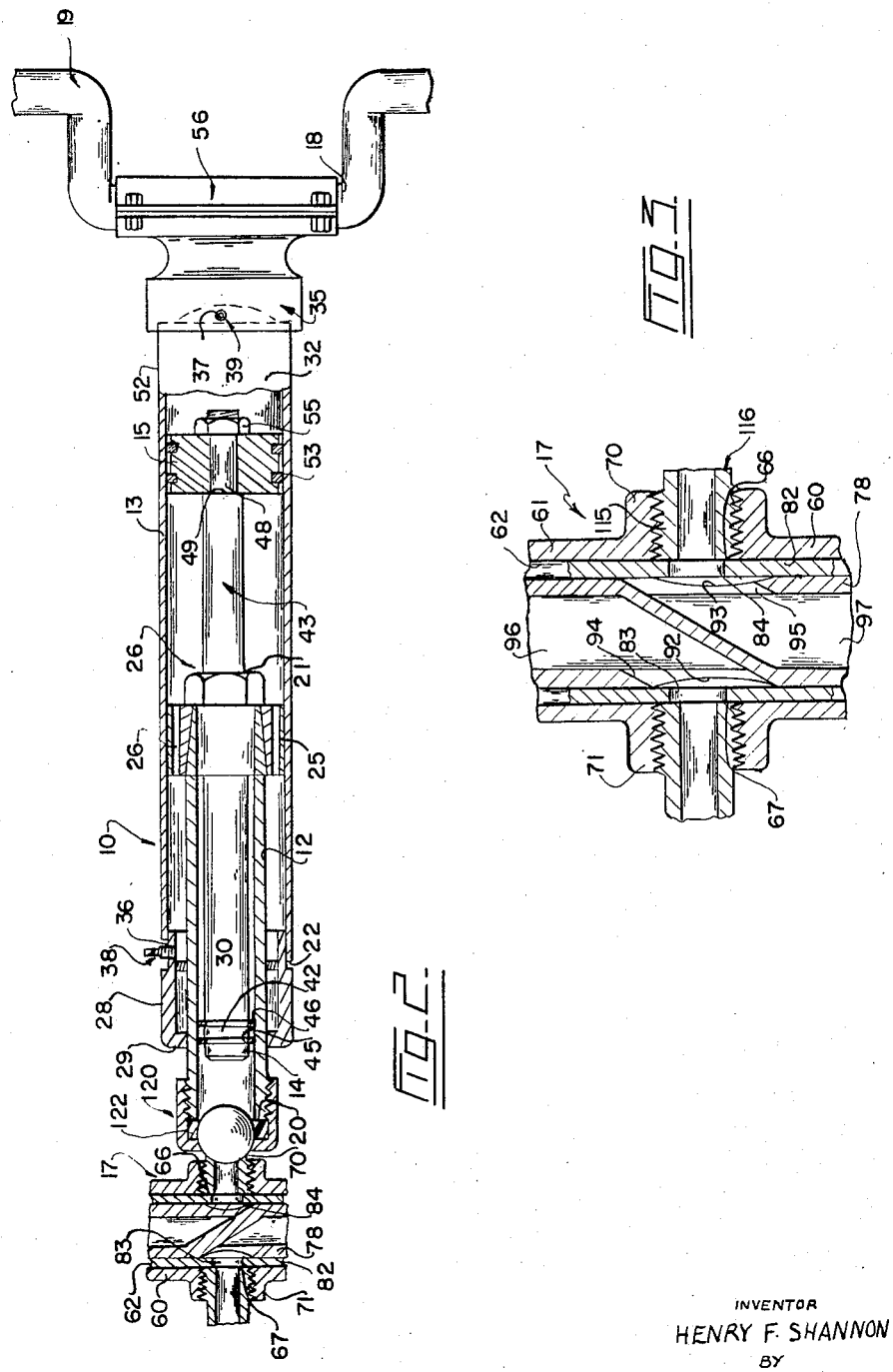

United States Patent Office 3,367,241
Patented Feb. 6, 1968

3,367,241
BI-FLUID HYDRAULIC TRANSMISSION
Henry F. Shannon, 794 Kamloops Ave., Penticton,
British Columbia, Canada
Filed Feb. 14, 1966, Ser. No. 527,321
5 Claims. (Cl. 91—217)

This invention relates to a transmission for transmitting energy in pressurized hydraulic fluid via a piston and cylinder arrangement to a rotatable element, such as a crankshaft or the like.

The object of this invention is to provide a simple, rugged and compact automotive traction transmission with similar automatic torque and speed changing qualities to a steam engine, and capable of being powered by a light weight gas or diesel engine which eliminates all such devices as slipping clutch, liquid torque converters, gear train, deferential gear, and the like, and which drives the ground wheels of a vehicle directly by means of a highly compressible and expansive fluid.

In the use of fully compressible substances, such as air, steam or combustible gases for driving the piston of a reciprocal engine, the cushioning effect of the compressible driving agent normally provides a smooth transfer of power to the piston and, consequently, to the rotatable element which is driven by the piston. The variations are, therefore, of the linear velocity of the piston relative to the velocity of the rotatable element is not a factor which poses any problem. Where, however, a non-compressible driving agent, such as a hydraulic fluid is employed to drive the piston, the velocity of the piston must be proportionate to the amount of oil delivered into the cylinder and, consequently, the angular movement of the rotatable element is fixed relative to the amount of fluid delivered to or discharged from the cylinder regardless of the operating pressure of the driving fluid. It is therefore necessary, where uniform angular velocity of the rotable element is desired, to provide for a variable flow of hydraulic fluid otherwise, with a uniform rate of flow of the hydraulic fluid, the angular velocity of the rotatable element must vary as the piston moves between positions of top and bottom dead centre.

In this latter type of transmission regardless of the fluid pressure available, the angular velocity of the rotatable element is limited to the quantity of fluid which can be delivered. The efficiency therefore decreases as velocity increases due to the relatively high frictional losses caused by high speed delivery of the hydraulic fluid. Where therefore a hydraulic driving agent is employed for driving an apparatus such as a motor vehicle whereby energy requirements are high during acceleration but when the vehicle reaches crusing speed, are greatly diminished, the increased volumetric flow of fluid necessary would provide for very inefficinet operation.

The present invention provides a piston-cylinder type of transmission which overcomes the problem common to transmissions of this type by providing a means whereby the hydraulically driven piston may be moved independently of the rotatable element which it drives, and which therefore permits increased or decreased angular velocity of the rotatable element regardless of the amount of hydraulic driving agent delivered to move the piston.

The present invention also provides a transmission wherein the rotable element is cushioned in its association with the incompressible hydraulic driving agent and which therefore permits relatively smooth operation of said element regardless of the rate of flow of said hydraulic fluid.

The invention further provides a transmission which utilizes a compact, high pressure hydraulic cylinder with a small built-in gas compressor, a small quantity of high pressure hydraulic fluid, a flow of which is controlled by the crank being the prime mover which is arranged to compress gas in a larger cylinder, telescoping over it, the air cylinder being connected to the crank that drives the ground wheels, the transference of energy from the hydraulic fluid to the gas being obtained by means of a common free floating piston which fits both cylinders and which has no mechanical connection to the wheels or any other working part.

It will be appreciated that the invention, although eminently suited to drive a rotatable element such as a crankshaft, may be drivingly engaged with a reciprocable element, and its is therefore to be understood that the terms reciprocable and rotatable in this particular instance are to be synonymous.

The present invention comprises transmission apparatus for operably connecting a reciprocable element and a source of hydraulic fluid comprising a hydraulic piston and cylinder assembly operably connected at one end to the source of hydraulic fluid, means for fixedly securing the cylinder of said assembly at said one end against linear movement relative to the reciprocable element, resilient compressible means operably connecting the piston of said assembly to the reciprocable element for reciprocal movement therewith, a valve at the cylinder operable for controlling the direction of flow of hydraulic fluid therein and thereout, valve operating means connected to the compressible element for operating the valve, said operating means being arranged to synchronize the flow of fluid into and out of the cylinder with corresponding movement of the reciprocable element away from and towards the cylinder.

In the drawings which illustrate the invention,

FIGURE 1 is a longitudinal central section of the invention, illustrating the valve assembly with portions thereof partially removed for the purpose of clarification, the piston of the hydraulic piston and cylinder assembly being illustrated in its most extended position, FIGURE 2 is also a longitudinal central section of the invention with the piston of the hydraulic piston and cylinder assembly being shown in its most retracted position, and FIGURE 3 is an enlarged central sectional view of the rotatable valve.

Referring to the drawings, the apparatus 10 comprises a pair of telescopically united relatively slidable cylinders 12 and 13, a pair of pistons 14 and 15 having a slidably sealable fit with cylinders 12 and 13 respectively, being interconnected for movement in unison, and a valve assembly 17 which is firmly secured to the frame of a vehicle to be driven and which is operated to alternately permit emission and discharge of pressurized hydraulic fluid into and out of cylinder 12. Cylinder 13 is connected to the crank arm 18 of a crankshaft 19, the latter also being secured for rotation to the frame of the vehicle in spaced relationship to the valve assembly 17.

Cylinder 12, which has a lesser external diameter than the internal diameter of cylinder 13, is elongated and open at both ends 20 and 21, both said ends being exteriorly threaded. End 21 which is exteriorly threaded slidably extends into the open end 22 of the cylinder 13, and is spaced from the inner walls thereof by an annular cap 25 fitted thereover and held thereon by a nut 26, said cap having longitudinally extending passages 27 formed therethrough. The diameter of the cap 25 is only slightly less than the inner diameter of cylinder 13 so as to form a tight yet slidable fit.

The open end 22 of cylinder 13 is also provided with an annular cap 28 secured thereto in a suitable manner. Said cap has an outer annular end portion 29 which slidably embraces the outer surface of cylinder 12, and is provided with inner annular sealing members 30 which may be rubber lip seals and which have a slidable yet sealing fit with the outer surface of cylinder 12.

Cylinder 13 is closed at its other end 32 by a cap 35 welded or otherwise fastened thereto, and both caps 28 and 35 are each provided with tapped holes 36 and 37 respectively into which air valves 38 and 39 respectively are screwed and through which a gas may be fed into and trapped inside cylinder 13.

The piston 14 comprises one end section 42 of an elongated cylindrical shaft 43, said end section 42 having an inner groove 45 formed therein for seating expansible metallic piston rings 46. This shaft 43 is elongated and extends through the capped end 21 of cylinder 12 into cylinder 13. This shaft 43 has a reduced portion 48 formed at its other end so as to form an annular shoulder 49. The piston 15 is formed of a relatively short annular sleeve which fits over said reduced portion 48 and is tightened down against the shoulder 49 by a nut 50 threaded over said reduced end portion 48. This sleeve is also formed having a pair of annular grooves 52 which serve as seats for a pair of annular lip seals 53 having a sealable slidable fit with the inner walls of cylinder 13.

To the cap 35 and cylinder 13 is secured a bearing block 56 by means of which said cylinder 13 is secured to the crank arm 18 of the crankshaft 19, suitable bearings being provided between the block and the crank arm in a known manner.

At the end 20 of the cylinder 12 is the valve assembly 17. This assembly comprises a housing 60 having an elongated tubular valve portion 61 having a bore 62, and having annular flange plates 63 and 64 at either end. The flange plates 63 and 64 are counterbored over the bore 62 to provide seats for ball bearings and race assemblies 65.

The valve portion 61 has formed, intermediate its ends, a pair of diametrically opposed apertures 66 and 67 respectively, over which internally threaded sleeves 70 and 71 are located. The valve portion 61 which may be cast with the flange plates and sleeves is also provided with a fastening bracket 73 which may also be cast integrally therewith, and which is provided with holes 74 by means of which the valve assembly may be secured rigidly to the frame of the vehicle in spaced relationship to the crankshaft 19.

Extending through the bore 62 of the valve assembly is an elongated cylindrical shaft 78 which is fitted with axially spaced annular flanges 80 and 81. This shaft is rotatably embraced by an elongated bushing 82 which extends between the flanges 80 and 81. This bushing 82 has substantially the same outside diameter as the inside diameter of the bore 62 so as to provide a tight press fit therein, and is provided with a pair of diametrically opposed apertures 83 and 84 which lie in registry with the apertures 66 and 67 respectively. Each of the flanges 80 and 81 is inwardly spaced from its associated ball bearing and race assembly 65, and inserted between each flange and its associated assembly 65 is an annular compressible packing element 90.

The shaft 78 is provided with a pair of diametrically opposed depressions 92 and 93 which lie in radial alignment with the apertures 83 and 84 of the bushing 82, and extending in opposite directions from each of the depressions are laterally inclined bores or passages 94 and 95, each of the latter forming the inner terminal of axial bores 96 and 97 respectively which extend from the ends 99 and 100 respectively of shaft 78.

The length of the shaft 78 is such that it terminates at its end 99 just short of the outer face of the annular flange plate 63, but extends at its other end 100 outwardly beyond flange plate 64.

To the flange plates 63 and 64 are bolted by bolts 102 annular caps 103 and 104 respectively, said caps being spaced from their associated flange plate by annular compressible gaskets 105. The relationship as to length of the components of the valve assembly is such that the gaskets 105 and annular packing elements 90 are deformed under compression when the bolts 102 are tightened to resiliently bear against the shaft 78, the fit being such as to be sufficiently snug to provide a hydraulic seal yet permit free rotation of the shaft 78.

The cap 103 is provided with an internally threaded aperture 106 which is in axial alignment with the bore 96 and into which a pipe fitting 107 is threaded, whereas cap 104 is provided with an aperture of a diameter a little larger than the outside diameter of the shaft 78 so as not to hinder the free rotation of the latter.

The shaft 78 is connected at its end 100 by means of a standard hydraulic swivel connection 109 to a hydraulic conduit 110.

Into the sleeve 70 is threaded one end 115 of a short length of pipe 116, said pipe having an enlarged spherical end 118 against which the end 20 of the cylinder 12 fits. Over the spherical end 118 of said pipe 116 is fitted a compression nut 120 having an annular compressible gland element 122, said nut 120 being internally threaded to threadedly engage external threads formed at the end 20 of said cylinder 12 so that the latter may be drawn into engagement with both the spherical end 118 of the pipe and the gland 122. This compression nut 120 has a loose fit over the pipe 116 and thereby provides a sealed swivel type connection between the end 118 of the pipe and the end 20 of the cylinder 12.

The crankshaft 19 and shaft 78 are operatively interconnected for mutual rotation through a gear train 130 as illustrated in FIGURE 1. This gear train comprises toothed gears 131 and 132, each non-rotatably connected to the crankshaft 19 and shaft 78 respectively which intermesh with gears 133 non-rotatably connected at the ends of an elongated gear shaft 134 carried in bearing blocks 135 secured to the frame of the vehicle to be driven. The relative diameters of gears 131, 132 and 133 are such that the crankshaft 19 and shaft 78 will rotate cooperatively at the same angular velocity. It will also be understood that the shaft 78 and crankshaft 19 may be operatively interconnected by means other than the gear train 130 as illustrated for example by a chain and sprocket drive, if desired.

The shaft 78 is connected by conduits 141 and 110 to a pump and reservoir asesmbly 142 which is shown diagrammatically in FIGURE 1, the pump of the pump and reservoir assembly 142 being driven by a suitable source of power such as a gasoline or diesel engine, and by means of which a hydraulic fluid may be forced by the pump into one end of the shaft 78 and discharged from its other end into reservoir of the pump and reservoir assembly. Pump and reservoir assemblies by means of which reverse of flow of a hydraulic fluid may be achieved, are of known manufacture and it is therefore deemed unnecessary to describe one selected in detail.

In the operation of the transmission apparatus, the shaft 78 and crankshaft 19 are angularly correlated so that when the crankshaft, as shown in FIGURE 1, is rotatably positioned so as to move the cylinders 12 and 13 to their most retracted position, the shaft 78 will assume a position in which depression 92 partially confronts the aperture 83 in the bushing 82, and depression 93 partially confronts the aperture 84 in said bushing. Rotation of the crankshaft through 180° will therefore reverse the positions of depressions 92 and 93 relative to apertures 83 and 84, this reversed position being illustrated in FIGURE 2 of the drawings. The cylinder 13 on both sides of the piston 15 is filled with a compressible gas which may be either air or nitrous oxide through the air valves 38 and 39, the pressure of the gas on either side of the piston 13 being equalized when the cylinders 12 and 13 and 15 are arranged as illustrated in FIGURE 2 in which said cylinders are telescoped to a most retracted position and in which the piston 15 is near but not touching the cap 26 of the open end 22 of the cylinder 12.

In the operation of the transmission apparatus commencing with the letter illustrated in FIGURE 1, the flow of fluid is directed by suitable controls governing the operation of the open reservoir assembly through conduit 110 and thence into cylinder 12. The pressure of the hydraulic fluid acting against piston 14 to move the latter will consequently result in movement of the piston 15 to increase the compression against cap 35. This pressure will build up until the torque necessary to turn the crankshaft 19 is overcome, thereby resulting in rotation of the crankshaft. As the crankshaft is operatively connected to the shaft 78, the latter will also rotate. Rotation of the crankshaft through 180° will, as illustrated in FIGURE 2, consequently reverse the position of the depressions 92 and 93 relative to the apertures 83 and 84 so as to place cylinder 12 in communication with the reservoir of the pump and reservoir assembly 142, and permitting the flow of pressurized oil through the axial bore 96 to be discharge through apertures 84. The momentum imparted to the crankshaft and the driving mechanism to which it is connected will result in the rotation of said crankshaft back to its position as shown in FIGURE 1, resulting therefore in the return of the piston and of cylinder 12, and the consequent ejection of the hydraulic fluid from cylinder 12 through the axial bore 97 and into the reservoir of the pump and cylinder assembly. When the cylinders 12 and 13 have again reached their most retracted position, cylinder 12 will again be placed in communication with the pressurized fluid via conduit 141 to recommence the power stroke.

It is to me appreciated that operation of the transmission apparatus will result in the ejection of hydraulic fluid through the sleeve 71 via the aperture 67, and where only one piston and cylinder assembly corresponding to pistons 12 and 13 and pistons 14 and 15 is to be used, this sleeve 71 may be connected by a suitable conduit, not shown, to the reservoir of the pump and reservoir assembly 142. However, it is intended that a duplicate piston and cylinder assembly corresponding to cylinders 12 and 13 and pistons 14 and 15 be connected to said sleeve 71 to drive another crankshaft, not shown, corresponding to crankshaft 19. This arrangement will thereby permit full utilization of the flow of pressurized hydraulic fluid delivered by the pump of the pump and reservoir assembly.

It will be appreciated that the reciprocal movement of the crankshaft 19 is not directly related to the reciprocal movements of the pistons 14 and 15. This will therefore provide a cushioning effect so as to provide a smoother transfer of power than otherwise would be obtained with a direct piston connection between the incompressible fluid and the crankshaft. Furthermore, this arrangement will permit full reciprocation of the pistons when crankshaft torque requirements are high, for example, when starting the vehicle in motion and will, conversely, permit reduced linear movement of the pistons when crankshaft torque requirements are low. This feature of the present invention will consequently permit the quantity of hydraulic fluid delivered to be varied in accordance with torque requirements of the crankshaft, and thereby reduce the friction losses which would otherwise be incurred if the quantity of fluid to be delivered was directly related to the angular velocity of the crankshaft.

What I claim as my invention is:

1. Transmission apparatus for operably connecting a reciprocable element and a source of hydraulic fluid comprising a hydraulic piston and cylinder assembly operably connected at one end to the source of hydraulic fluid, means for fixedly securing the cylinder of said assembly at said one end against linear movement relative to the reciprocable element, resilient compressible means operably connecting the piston of said assembly to the reciprocable element for reciprocal movement therewith, a valve at the cylinder operable for controlling the direction of flow of hydraulic fluid therein and thereout, valve operating means connected to the reciprocable element for operating the valve, said operating means being arranged to synchronize the flow of fluid into and out of the cylinder with corresponding movement of the reciprocable element away from and towards the cylinder.

2. Transmission apparatus as claimed in claim 1 wherein the resilient compressible means comprises a pneumatic piston and cylinder assembly, the cylinder of said pneumatic assembly being closed at one end to form a variable size chamber adapted to contain a compressible gas, said last-mentioned cylinder being operably connected at its closed end to the reciprocable element and the piston thereof being connected to the piston of the hydraulic assembly for movement in unison therewith.

3. Transmission apparatus as claimed in claim 2 in which both cylinders are telescopically and slidably connected for relative linear movement.

4. Transmission apparatus for operably connecting a reciprocable element and a source of hydraulic fluid comprising a hydraulic piston and cylinder assembly operably connected at one end to the source of hydraulic fluid, the cylinder thereof being open at its other end, means for fixedly securing the cylinder of said assembly at said one end against linear movement relative to the reciprocable element, a second hollow cylinder closed at one end and open at its other end arranged to slidably receive the open end of the hydraulic cylinder, guide means at the open ends of each of the cylinders slidably engaging the other of said cylinders, said guide means being arranged to maintain both cylinders in co-axial alignment, means operably connecting the closed end of the second cylinder to the reciprocable element, a piston in the second cylinder forming at its closed end a variable sized compartment adapted to contain a gas, means connecting the piston of both cylinders for movement in unison, a valve at the hydraulic piston and cylinder assembly for controlling the direction of flow of hydraulic fluid therein and thereout, valve operating means connected to the reciprocable element for operating the valve, said operating means being arranged to synchronize the flow of fluid into and out of the hydraulic cylinder with corresponding movement of the reciprocable element away from and towards said hydraulic cylinder.

5. Transmission apparatus as claimed in claim 4 including sealing means at the open end of the second cylinder slidably and sealably engaging the hydraulic cylinder, thereby forming an annular chamber of variable size one end of which is defined by the piston of the second cylinder, said annular chamber being adapted to be filled with a gas.

No references cited.

MARTIN P. SCHWADRON, *Primary Examiner.*

ROBERT R. BUNEVICH, *Examiner.*